United States Patent
Rugeland et al.

(10) Patent No.: US 12,335,954 B2
(45) Date of Patent: Jun. 17, 2025

(54) OVERHEATING CONFIGURATION IN (NG) EN-DC

(71) Applicant: Telefonaktiebolaget LM Ericsson (publ), Stockholm (SE)

(72) Inventors: Patrik Rugeland, Bromma (SE); Lian Araujo, Solna (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 17/638,351

(22) PCT Filed: Aug. 26, 2020

(86) PCT No.: PCT/SE2020/050822
§ 371 (c)(1),
(2) Date: Feb. 25, 2022

(87) PCT Pub. No.: WO2021/040608
PCT Pub. Date: Mar. 4, 2021

(65) Prior Publication Data
US 2022/0322335 A1  Oct. 6, 2022

Related U.S. Application Data

(60) Provisional application No. 62/892,969, filed on Aug. 28, 2019.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0098* (2013.01); *H04W 52/0235* (2013.01); *H04W 76/15* (2018.02)

(58) Field of Classification Search
CPC . H04W 72/21; H04W 76/15; H04W 52/0235; H04L 5/0098
See application file for complete search history.

(56) References Cited

U.S. PATENT DOCUMENTS

| | | | |
|---|---|---|---|
| 2011/0263212 A1* | 10/2011 | Yeh | H04W 28/22 455/73 |
| 2020/0106674 A1* | 4/2020 | Van Der Velde | H04W 52/0238 |
| 2020/0267665 A1* | 8/2020 | Wei | H04W 52/365 |

OTHER PUBLICATIONS

Huawei et al.; "38.331 CR for addressing overheating issue in EN-DC scenario—Option 2"; 3GPP TSG-RAN2 Meeting #107; R2-1911041; Prague, Czech Republic; Aug. 26-30, 2019; XP051768803; 9 pages.

(Continued)

*Primary Examiner* — Brenda H Pham
(74) *Attorney, Agent, or Firm* — Sage Patent Group

(57) ABSTRACT

A method, network node and wireless device for an overheating configuration in NG EN-DC are disclosed. According to one aspect, a wireless device configured to communicate with a master node configured to operate using a first radio access technology, RAT, and to communicate a secondary node configured to operate using a second RAT is provided. The wireless device is configured to determine an overheating configuration for the wireless device, and indicate the overheating configuration using at least: a first indication associated with both the first RAT operation and second RAT operation; and a second indication associated with only one of the first RAT operation and second RAT operation.

17 Claims, 7 Drawing Sheets

(51) Int. Cl.
*H04W 52/02* (2009.01)
*H04W 76/15* (2018.01)

(56) References Cited

OTHER PUBLICATIONS

Huawei et al.; "Further consideration on overheating issue in EN-DC scenario"; 3GPP TSG-RAN2 Meeting #107; R2-1911036; Prague, Czech Republic; Aug. 26-30, 2019; XP051768798; 4 pages.
Huawei et al.; "38.331 Draft CR for addressing overheating issue in EN-DC scenario—Option 2"; 3GPP TSG-RAN WG2 #106; R2-1907870; Reno, Nevada, USA; May 13-17, 2019; XP051731296; 8 pages.
International Search Report and Written Opinion mailed on Nov. 17, 2020 for International Application No. PCT/SE2020/050822, 12 pages.

* cited by examiner

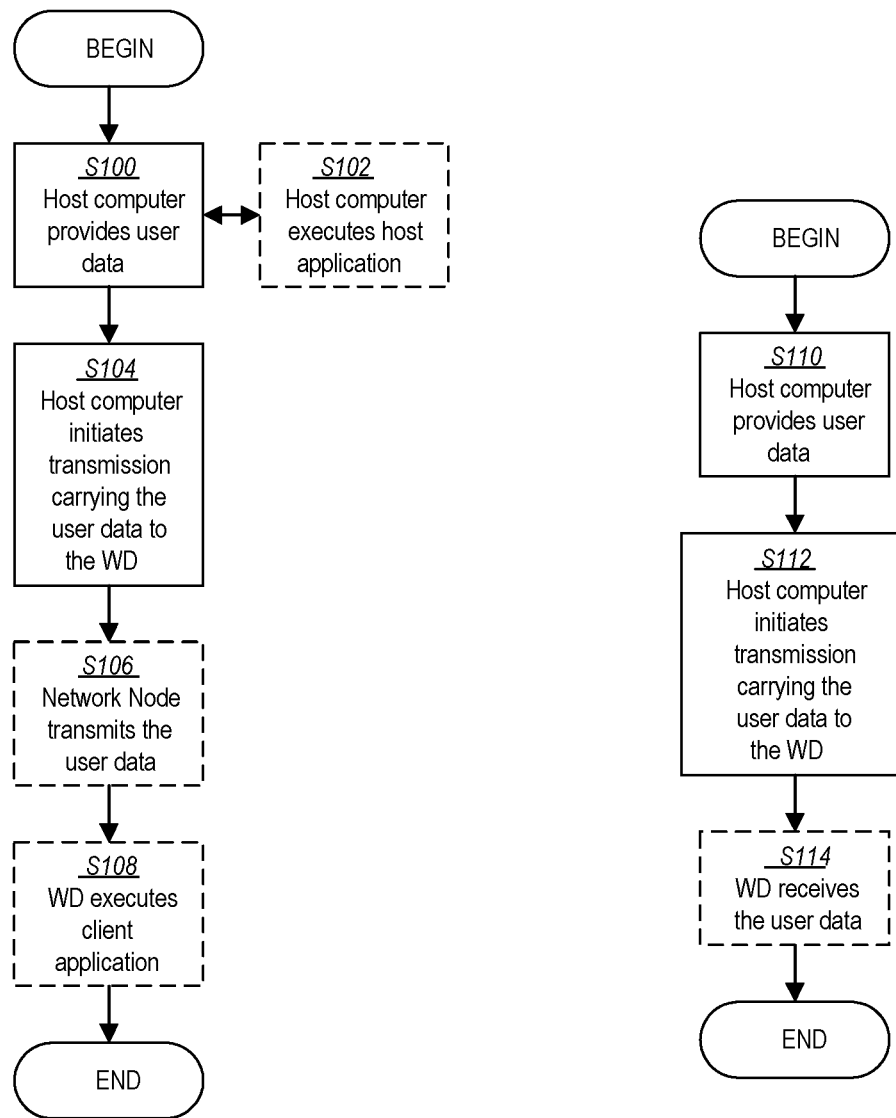

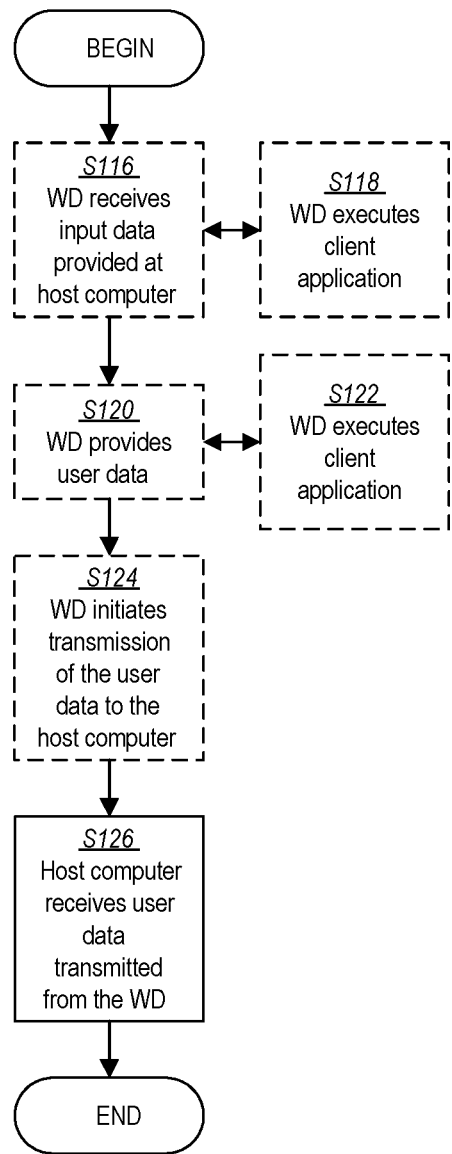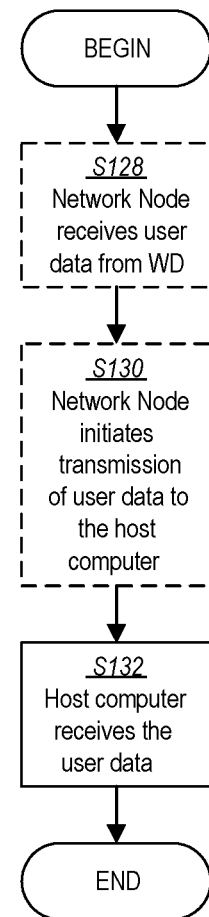
FIG. 6
FIG. 7

OVERHEATING CONFIGURATION IN (NG) EN-DC

CROSS-REFERENCE TO RELATED APPLICATIONS

This application is a Submission Under 35 U.S.C. § 371 for U.S. National Stage Patent Application of International Application No.: PCT/SE2020/050822, filed Aug. 26, 2020 entitled "OVERHEATING CONFIGURATION IN (NG) EN-DC," which claims priority to U.S. Provisional Application No. 62/892,969, filed Aug. 28, 2019, entitled "OVERHEATING CONFIGURATION IN (NG) EN-DC," the entireties of both of which are incorporated herein by reference.

TECHNICAL FIELD

The present disclosure relates to wireless communications, and in particular, to an overheating configuration in Next Generation (NG) evolved universal terrestrial radio access network New Radio (NR) dual connectivity (EN-DC).

BACKGROUND

The 3$^{rd}$ Generation Partnership Project (3GPP) is currently developing the New Radio (NR, also called 5$^{th}$ Generation (5G)) wireless communication standard. This new standard being developed is an advancement over the current Long Term Evolution (LTE) wireless communication standard and includes EN-DC.

In LTE Technical Release 14 (Rel-14), WD assistance information indicating that the WD was overheating was introduced. The WD can indicate a preferred reduced number of carriers (in the uplink (UL) and/or the downlink (DL)) as well as a reduced WD category. A category may indicate the maximum bandwidth the WD is capable of, i.e., a reduced category would reduce the maximum bitrate.

This was captured in the procedures defined by the 3GPP Technical Standard (TS) 36.331 as follows:

The WD shall set the contents of the WDAssistanceInformation message for overheating assistance indication:
 if the WD experiences internal overheating:
  if the WD prefers to temporarily reduce its DL category and UL category:
   include reducedUE-Category in the OverheatingAssistance IE;
   set reducedUE-CategoryDL to the number to which the WD prefers to temporarily reduce its DL category;
   set reducedUE-CategoryUL to the number to which the WD prefers to temporarily reduce its UL category;
  if the WD prefers to temporarily reduce the number of maximum secondary component carriers:
   include reducedMaxCCs in the OverheatingAssistance IE;
   set reducedCCsDL to the number of maximum SCells the WD prefers to be temporarily configured in downlink;
   set reducedCCsUL to the number of maximum SCells the WD prefers to be temporarily configured in uplink;
  start timer T345 with the timer value set to the overheatingIndicationProhibitTimer;
 else (if the WD no longer experiences an overheating condition):
  do not include reducedUE-Category and reducedMaxCCs in OverheatingAssistance IE;
  start timer T345 with the timer value set to the overheatingIndicationProhibitTimer;

where the message used is the WDAssistanceInformation with the OverHeatingAssistance information element (IE),
according to the following pseudo code:

```
UEAssistanceInformation-v1450-IEs ::= SEQUENCE {
  overheatingAssistance-r14
  OverheatingAssistance-r14              OPTIONAL,
  nonCriticalExtension
  UEAssistanceInformation-v1530-IEs      OPTIONAL
}
OverheatingAssistance-r14 ::=  SEQUENCE {
  reducedUE-Category                     SEQUENCE {
    reducedUE-CategoryDL                   INTEGER (0..19),
    reducedUE-CategoryUL                   INTEGER (0..21)
  }      OPTIONAL,
  reducedMaxCCs                          SEQUENCE {
    reducedCCsDL                           INTEGER (0..31),
    reducedCCsUL                           INTEGER (0..31)
  }      OPTIONAL
}
```

Once the network, e.g., network node, receives this message, it can reconfigure the wireless device (WD) with, for example, fewer carriers, or release some data radio bearers (DRBs) to reduce the bitrate. Alternatively, the network can release the WD to RRC_IDLE.

In NR, WD assistance information regarding overheating information was introduced in the 3GPP Technical Standard (TS) 38.331, version15.4.0 as seen below according to the following pseudo code:

```
UEAssistanceInformation-v1540-IEs ::= SEQUENCE {
  overheatingAssistance         OPTIONAL,
  nonCriticalExtension          SEQUENCE { }           OPTIONAL
}
OverheatingAssistance ::=       SEQUENCE {
  reducedMaxCCs                 SEQUENCE {
    reducedCCsDL                  INTEGER (0..31),
    reducedCCsUL                  INTEGER (0..31)
  } OPTIONAL,
  reducedMaxBW-FR1              SEQUENCE {
    reducedBW-FR1-DL              ReducedAggregatedBandwidth,
    reducedBW-FR1-UL              ReducedAggregatedBandwidth
  } OPTIONAL,
  reducedMaxBW-FR2              SEQUENCE {
    reducedBW-FR2-DL              ReducedAggregatedBandwidth,
    reducedBW-FR2-UL              ReducedAggregatedBandwidth
  } OPTIONAL,
  reducedMaxMIMO-LayersFR1      SEQUENCE {
    reducedMIMO-LayersFR1-DL      MIMO-LayersDL,
    reducedMIMO-LayersFR1-UL      MIMO-LayersUL
  } OPTIONAL,
  reducedMaxMIMO-LayersFR2      SEQUENCE {
    reducedMIMO-LayersFR2-DL      MIMO-LayersDL,
    reducedMIMO-LayersFR2-UL      MIMO-LayersUL
  } OPTIONAL
}
```

In NR, in contrast to LTE, there are no WD categories. Instead, the network can deduce the requested reduced bandwidth from the parameters:
 -reducedCCsDL/UL
  a) Indicated the requested reduced number of component carriers in UL or DL
 -reducedBW-FR1/FR2-DL/UL
  a) Indicated the requested reduced bandwidth in FR1 or FR2 in UL or DL
 -reducedMIMO-FR1-FR2-LayersUL/DL a) Indicated the requested reduced number of MIMO layers in FR1 or FR2 in UL or DL In EN-DC, it was discussed that the WD would signal the joint reduced number of component carries for the master cell group (MCG) and secondary cell group (SCG), using the LTE information elements (IEs), i.e., reducedCCsDL/UL. However, since the LTE master base station (MeNB) would not receive any information about the requested reduced bandwidth or multiple input multiple output (MIMO) layers, the MeNB could release the whole SCG configuration.

In one technical release (RAN2 #107 (R2-1911036)), it has been proposed that the WD would be able to signal the NR overheatingInformation via the LTE MeNB, either by extending the LTE signaling with NR IEs, or by including an entire NR WDAssistanceInformation in an LTE message. This NR overheating information would be forwarded to the NR secondary node (SN) which could then reconfigure the SN/SCG part of the WD configuration, e.g., reduce the number of carriers, or reduce the bandwidth or number of MIMO layers.

The current solution for overheating information in (NG) EN-DC does not allow specification of to which cell group the carriers which the WD would prefer to release belong (i.e., the MCG or SCG carriers) and thus it is not possible for the MeNB to release carriers of the correct CG.

Using the solution proposed in RAN2 #107 (R2-1911036), both the MeNB and the SgNB could receive overheating information. However, since the overheating information which the WD indicates to the MCG is a single number (related to both the MCG and SCG), the MCG cannot make a detailed decision on how many MCG and/or SCG carriers it should release.

For example, if the WD indicates a reduced number of component carriers in the LTE overheatingInformation IE, this would refer to both the LTE and NR carriers, but the MeNB would not know whether the WD would prefer to release LTE or NR carriers, or how many of each.

FIG. 1 shows a problem with known methods of WD configuration. In FIG. 1, the WD (shown as a UE in FIG. 1) is configured with an LTE base station (eNB) as a master node (MN), (i.e., an MeNB) and a NR base station (gNB) as secondary node (SN) (i.e., an SgNB). In this example, the WD has three carriers in the MN: 1, 2 and 3. The WD also has three carriers in the SN: 4, 5 and 6. Due to overheating the WD prefers to release two carriers, e.g., one carriers in the MN and one carrier in the SN. According to known methods, the WD would indicate a number 2 to the MeNB. But the MeNB would not know if the WD prefers to release two of the MN-carriers, or one of the MN-carriers and one of the SN-carriers, or two of the SN-carriers. The MN may therefore, release two MN-carriers and that would result in throughput loss in case the SN also decides to release carriers for the WD. Or the MN may release no carriers for the WD and that may result in persistence of overheating.

SUMMARY

Some embodiments advantageously provide methods, network nodes and wireless devices for an overheating configuration in NG EN-DC.

Some embodiments provide a new field with LTE-only information sent to the eNB, alongside the current information.

The existing field in LTE-overheating information can indicate either total or LTE-only information:

The WD may have a legacy bit field that indicates total or LTE-only information; and/or It may be implicit that the field means "total" in absence of the container which is to be sent to the NR gNB, or it means LTE-only in presence of the container.

The MN will be able to get overheating information from the WD which it can know how to interpret. In other words, the MN may disregard information which relates to the SN and only release the number of MCG carriers needed to avoid WD overheating.

According to one aspect of the disclosure, a wireless device configured to communicate with a master node configured to operate using a first radio access technology, RAT, and to communicate a secondary node configured to operate using a second RAT is provided. The wireless device configured to: determine an overheating configuration for the wireless device and indicate the overheating configuration using at least: a first indication associated with both the first RAT operation and second RAT operation, and a second indication associated with only one of the first RAT operation and second RAT operation.

According to one or more embodiments of this aspect, the first indication associated with both the first RAT and second RAT indicates a combined parameter for first RAT operation and second RAT operation where the second indication associated with only one of the first RAT and second RAT indicates a singular parameter for only one of the first RAT operation and the second RAT operation. According to one or more embodiments of this aspect, the combined parameter corresponds to a combined number of carriers for first RAT operation and second RAT operation, and the singular parameter corresponds to a total number of carriers for only one of the first RAT operation and the second RAT operation. According to one or more embodiments of this aspect, the overheating configuration corresponds to a recommended configuration determined by the wireless device where the recommended configuration is different from a current wireless device configuration.

According to one or more embodiments of this aspect, the determining of the overheating configuration for the wireless device is triggered based at least on one of the wireless device being in an overheated state and the wireless device attempting to avoid the overheated state. According to one or more embodiments of this aspect, the first RAT is Long Term Evolution, LTE, and the second RAT is New Radio, NR. According to one or more embodiments of this aspect, the wireless device is further configured to receive an updated configuration for uplink and downlink communications for at least one of the master node and secondary node where the updated configuration is based at least on the indicated overheating configuration. According to one or more embodiments of this aspect, the first indication is included in a first set of information elements, IEs, for use by the first RAT where the second indication is included in a second set of IEs for use by the second RAT, and where the second set of IEs is different from the first set of IEs, and where the first set of IEs and second set of IEs is signaled in a same signaling. According to one or more embodiments of this aspect, the wireless device is configured to receive an updated component carrier configuration associated with at least one of the master node and secondary node where the updated component carrier configuration is based on the overheating configuration and corresponds to a reduced number of component carriers compared to a previous component carrier configuration, and operate according to the updated component carrier configuration.

According to another aspect of the disclosure, a first node configured to operate using a first radio access technology, RAT, for communicating with a wireless device is provided. The wireless device is further configured to communicate with a second node configured to operate using a second RAT where the first node is configured to receive an indication of an overheating configuration of the wireless device, and where the indication includes at least: a first indication associated with both first RAT operation and second RAT operation, and a second indication associated with only one of first RAT operation and second RAT operation.

According to one or more embodiments of this aspect, the first indication associated with both the first RAT and second RAT indicates a combined parameter for first RAT operation and second RAT operation where the second indication associated with only one of the first RAT and second RAT indicates a singular parameter for only one of the first RAT operation and the second RAT operation. According to one or more embodiments of this aspect, the combined parameter corresponds to a combined number of carriers for first RAT operation and second RAT operation, and the singular parameter corresponds to a total number of carriers for only one of the first RAT operation and the second RAT operation. According to one or more embodiments of this aspect, the overheating configuration corresponds to a recommended configuration determined by the wireless device where the recommended configuration is different from a current wireless device configuration.

According to one or more embodiments of this aspect, the overheating configuration indicates that the wireless device is one of in an overheated state and is attempting to avoid the overheated state. According to one or more embodiments of this aspect, the first RAT is Long Term Evolution, LTE, and the second RAT is New Radio, NR. According to one or more embodiments of this aspect, the first node is further configured to transmit an updated configuration for uplink and downlink communications for the first node where the updated configuration is based at least on the indicated overheating configuration.

According to one or more embodiments of this aspect, the first indication is included in a first set of information elements, IEs, for use by the first RAT where the second indication is included in a second set of IEs for use by the second RAT, and where the second set of IEs is different from the first set of IEs, and where the first set of IEs and second set of IEs is signaled in a same signaling. According to one or more embodiments of this aspect, the first node is further configured to transmit an updated component carrier configuration associated with the first node where the updated component carrier configuration is based on the overheating configuration and corresponding to a reduced number of component carriers compared to a previous component carrier configuration.

According to another aspect of the disclosure, a method implemented by a wireless device that is configured to communicate with a master node configured to operate using a first radio access technology, RAT, and to communicate a secondary node configured to operate using a second RAT is provided. An overheating configuration for the wireless device is determined. The overheating configuration is indicated using at least: a first indication associated with both the first RAT operation and second RAT operation; and a second indication associated with only one of the first RAT operation and second RAT operation.

According to one or more embodiments of this aspect, the first indication associated with both the first RAT and second RAT indicates a combined parameter for first RAT operation and second RAT operation where the second indication associated with only one of the first RAT and second RAT indicates a singular parameter for only one of the first RAT operation and the second RAT operation. According to one or more embodiments of this aspect, the combined parameter corresponds to a combined number of carriers for first RAT operation and second RAT operation, and the singular parameter corresponds to a total number of carriers for only one of the first RAT operation and the second RAT operation. According to one or more embodiments of this aspect, the overheating configuration corresponds to a recommended configuration determined by the wireless device where the recommended configuration is different from a current wireless device configuration.

According to one or more embodiments of this aspect, the determining of the overheating configuration for the wireless device is triggered based at least on one of the wireless device is in an overheated state and the wireless device attempting to avoid the overheated state. According to one or more embodiments of this aspect, the first RAT is Long Term Evolution, LTE, and the second RAT is New Radio, NR. According to one or more embodiments of this aspect, the wireless device is further configured to receive an updated configuration for uplink and downlink communications for at least one of the master node and secondary node where the updated configuration is based at least on the indicated overheating configuration.

According to one or more embodiments of this aspect, the first indication is included in a first set of information elements, IEs, for use by the first RAT where the second indication is included in a second set of IEs for use by the second RAT, and where the second set of IEs is different from the first set of IEs, and where the first set of IEs and second set of IEs is signaled in a same signaling. According to one or more embodiments of this aspect, an updated component carrier configuration associated with at least one of the master node and secondary node is received where the updated component carrier configuration is based on the overheating configuration and corresponds to a reduced number of component carriers compared to a previous component carrier configuration. Operation is performed according to the updated component carrier configuration.

According to another aspect of the disclosure, a method implemented by a first node configured to operate using a first radio access technology, RAT, for communicating with a wireless device is provided. The wireless device is further configured to communicate with a second node configured to operate using a second RAT. An indication of an overheating configuration of the wireless device is received where the indication including at least: a first indication associated with both first RAT operation and second RAT operation, and a second indication associated with only one of first RAT operation and second RAT operation.

According to one or more embodiments of this aspect, the first indication associated with both the first RAT and second RAT indicates a combined parameter for first RAT operation and second RAT operation where the second indication associated with only one of the first RAT and second RAT indicates a singular parameter for only one of the first RAT operation and the second RAT operation. According to one or more embodiments of this aspect, the combined parameter corresponds to a combined number of carriers for first RAT operation and second RAT operation, and the singular parameter corresponds to a total number of carriers for only one of the first RAT operation and the second RAT operation. According to one or more embodiments of this aspect, the overheating configuration corresponds to a recommended configuration determined by the wireless device where the recommended configuration is different from a current wireless device configuration.

According to one or more embodiments of this aspect, the overheating configuration indicates that the wireless device is one of in an overheated state and is attempting to avoid the overheated state. According to one or more embodiments of this aspect, the first RAT is Long Term Evolution, LTE, and the second RAT is New Radio, NR. According to one or more embodiments of this aspect, an updated configuration for uplink and downlink communications for the first node is transmitted where the updated configuration is based at least on the indicated overheating configuration.

According to one or more embodiments of this aspect, the first indication is included in a first set of information elements, IEs, for use by the first RAT where the second indication is included in a second set of IEs for use by the second RAT, and where the second set of IEs is different from the first set of IEs, and where the first set of IEs and second set of IEs is signaled in a same signaling. According to one or more embodiments of this aspect, an updated component carrier configuration associated with the first node is transmitted where the updated component carrier configuration is based on the overheating configuration and corresponds to a reduced number of component carriers compared to a previous component carrier configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

FIG. 6 is a flowchart illustrating example methods implemented in a communication system including a host computer, a network node and a wireless device for receiving user data from the wireless device at a host computer according to some embodiments of the present disclosure;

FIG. 7 is a flowchart illustrating example methods implemented in a communication system including a host computer, a network node and a wireless device for receiving user data at a host computer according to some embodiments of the present disclosure;

DETAILED DESCRIPTION

Figure 1:
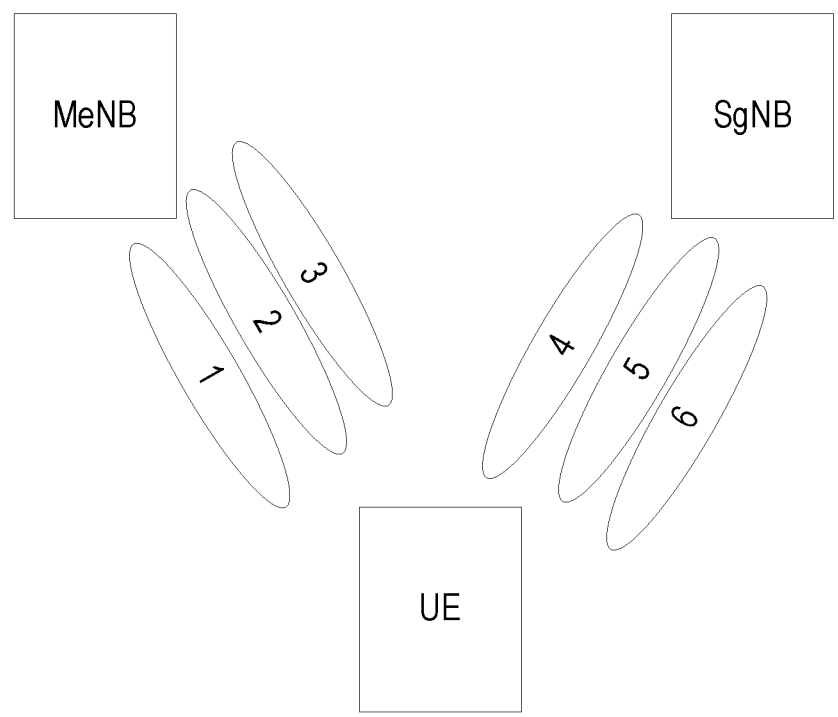
FIG. 1 is a diagram of a conventional delivery of information on different carriers from a master node and a secondary node.

Before describing in detail exemplary embodiments, it is noted that the embodiments reside primarily in combinations of apparatus components and processing steps related to an overheating configuration in NG EN-DC. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein may be used interchangeably with "node" and can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in the downlink may pertain to transmission from the network or network node to the wireless device. Transmitting in the uplink may pertain to transmission from the wireless device to the network or network node. Transmitting in the sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide an overheating configuration in NG EN-DC. According to one aspect, a method includes determining overheating information, the overheating information including an indication of whether certain carriers of the WD are contributing to the overheating and transmit to the network node the overheating information.

Figure 2:
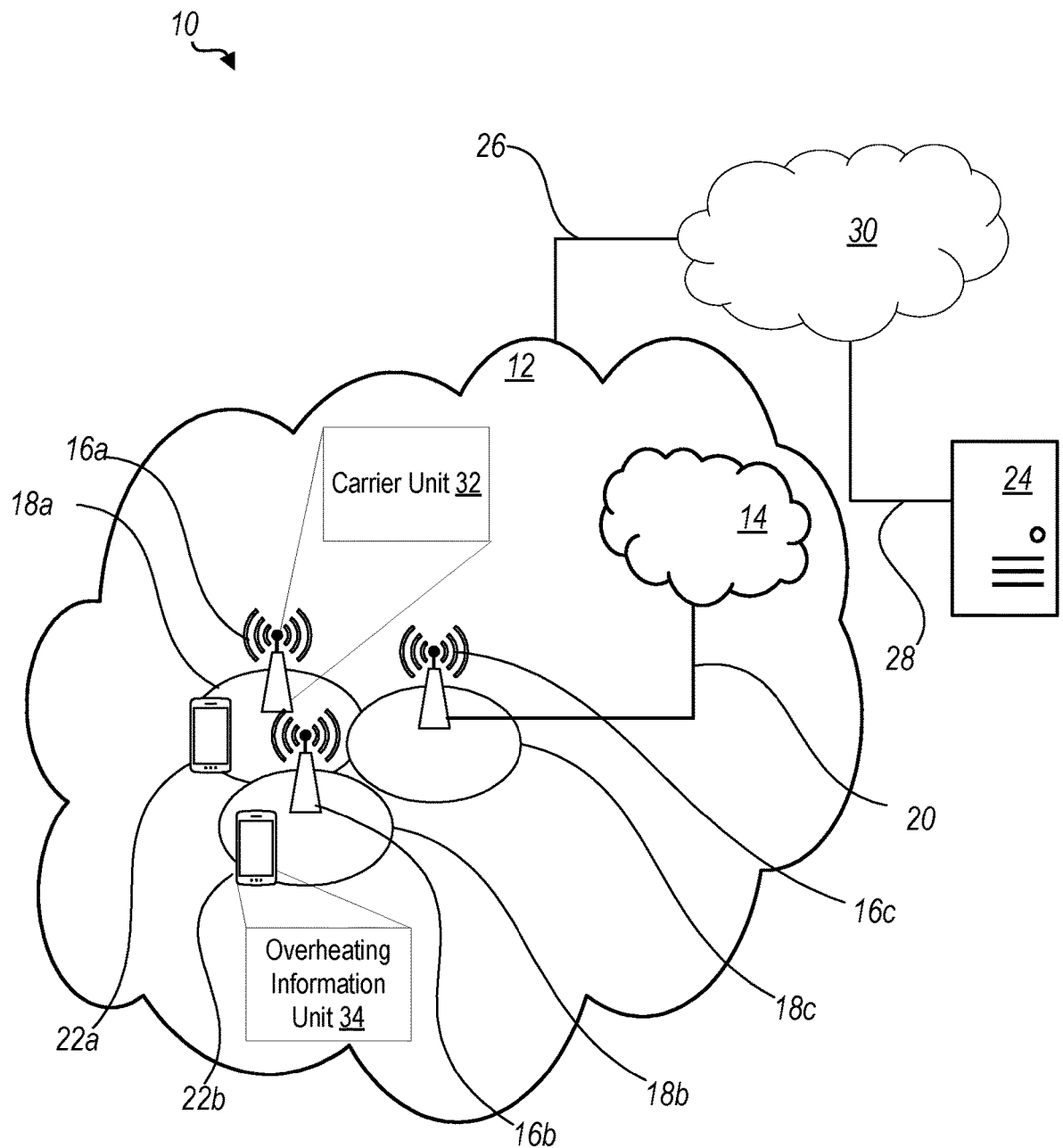
FIG. 2 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. Further, one or more network nodes 16 (also referred to as "node 16") may operate using a first RAT (e.g., LTE or 4G) to communicate with WD 22, while one or more other network nodes 16 may operate using a second RAT (e.g., NR or 5G) to communicate with the WD 22.

In particular, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a carrier unit 32 which is configured to assign carriers to the WD according to the overheating information. A wireless device 22 is configured to include an overheating information unit 34 which is configured to determine overheating information, the overheating information including an indication of whether certain carriers of the WD are contributing the overheating.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include carrier unit 32 which is configured to assign carriers to the WD according to the overheating information.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include overheating information unit 34 which is configured to determine overheating information, the overheating information including an indication of whether certain carriers of the WD are contributing the overheating.

Figure 3:
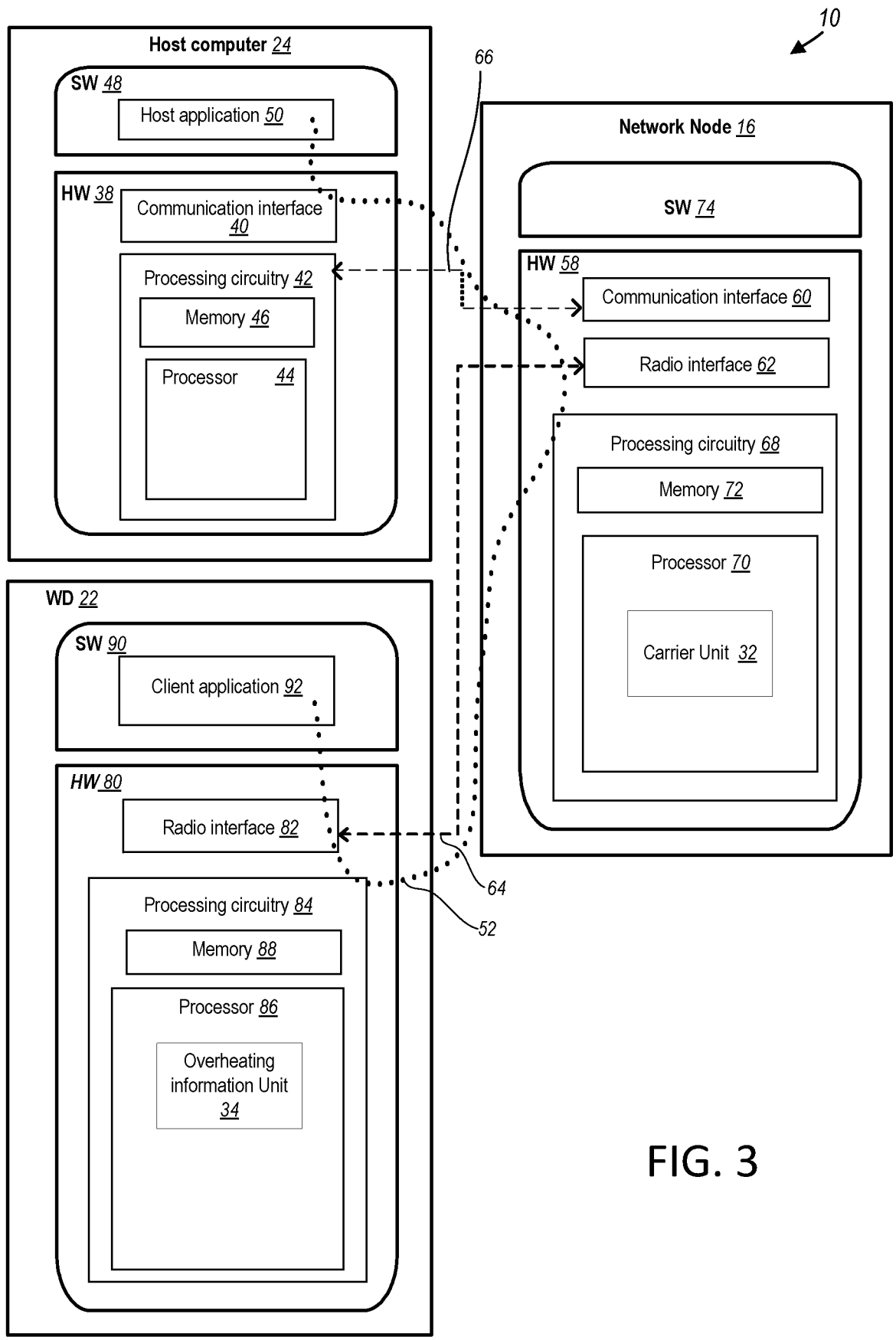
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 3.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as carrier unit 32, and overheating information unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
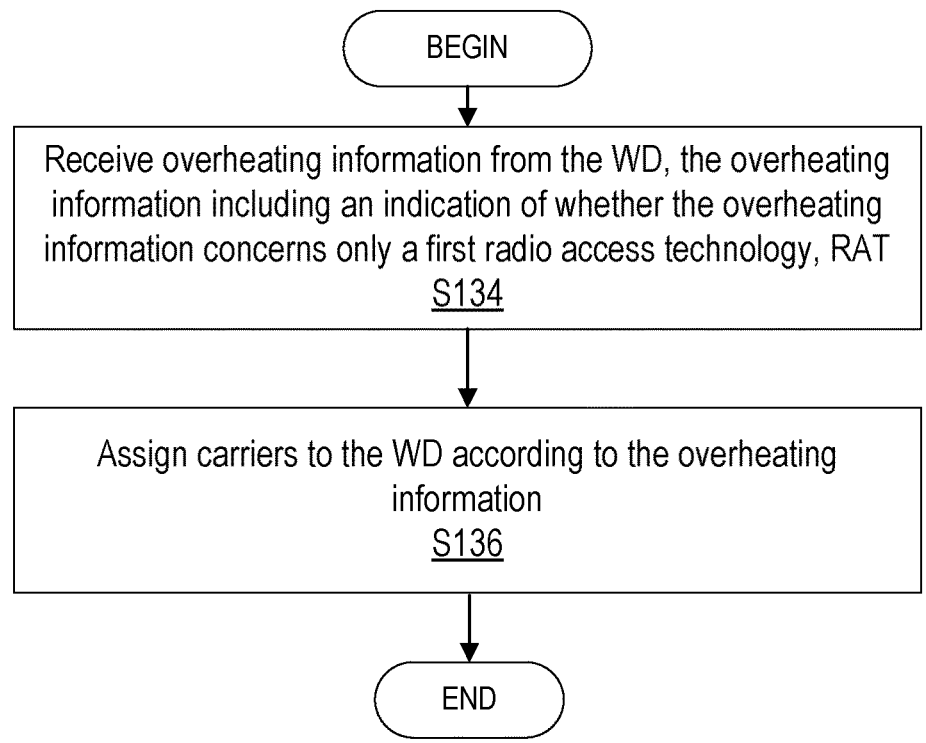
FIG. 8 is a flowchart of an example process in a network node for an overheating configuration in NG EN-DC.

FIG. 8 is a flowchart of an example process in a network node 16 for an overheating configuration in NG EN-DC. One or more blocks described herein may be performed by one or more elements of network node 16 such as by one or more of processing circuitry 68 (including the carrier unit 32), processor 70, radio interface 62 and/or communication interface 60. Network node 16 such as via processing circuitry 68 and/or processor 70 and/or radio interface 62 and/or communication interface 60 is configured to receive overheating information from the WD 22, the overheating information including an indication of whether the overheating information concerns only a first radio access technology, RAT (Block S134). The process includes assigning carriers to the WD 22 according to the overheating information (Block S136).

Figure 9:
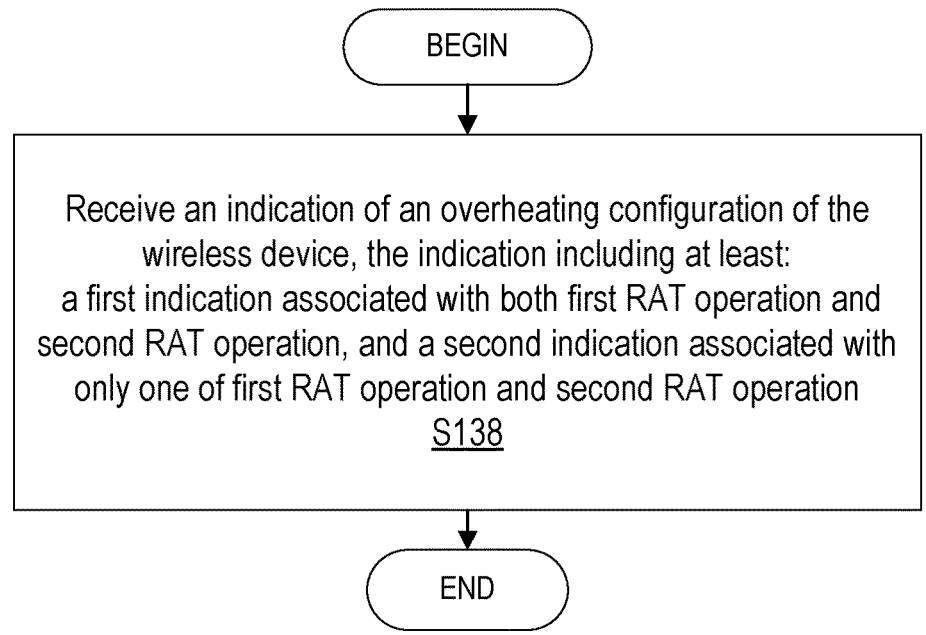
FIG. 9 is a flowchart of another example process in a network node for an overheating configuration in NG EN-DC.

FIG. 9 is a flowchart of another example process in a network node 16 according to the principles of the disclosure. The network node 16 (i.e., first node 16) is configured to operate using a first RAT for communicating with a wireless device 22 where the wireless device 22 is further configured to communicate with a second node (i.e., network node 16 such as a second network node) that is configured to operate using a second RAT. One or more blocks described herein may be performed by one or more elements of network node 16 such as by one or more of processing circuitry 68 (including the carrier unit 32), processor 70, radio interface 62 and/or communication interface 60. Network node 16 such as via processing circuitry 68 and/or processor 70 and/or radio interface 62 and/or communication interface 60 is configured to receive (Block S138) an indication of an overheating configuration of the wireless device, the indication including at least: a first indication associated with both first RAT operation and second RAT operation, and a second indication associated with only one of first RAT operation and second RAT operation, as described herein.

According to one or more embodiments, the first indication associated with both the first RAT and second RAT indicates a combined parameter for first RAT operation and second RAT operation, and the second indication associated with only one of the first RAT and second RAT indicates a singular parameter for only one of the first RAT operation and the second RAT operation. According to one or more embodiments, the combined parameter corresponds to a combined number of carriers for first RAT operation and second RAT operation, and the singular parameter corresponds to a total number of carriers for only one of the first RAT operation and the second RAT operation. According to one or more embodiments, the overheating configuration corresponds to a recommended configuration determined by the wireless device 22 where the recommended configuration is different from a current wireless device configuration.

According to one or more embodiments, the overheating configuration indicates that the wireless device 22 is one of in an overheated state and is attempting to avoid the overheated state. According to one or more embodiments, the first RAT is Long Term Evolution, LTE, and the second RAT is New Radio, NR. According to one or more embodiments, the network node 16 is further configured to transmit an updated configuration for uplink and downlink communications for the first node where the updated configuration is based at least on the indicated overheating configuration.

According to one or more embodiments, the first indication is included in a first set of information elements, IEs, for use by the first RAT, and the second indication is included in a second set of IEs for use by the second RAT where the second set of IEs are different from the first set of IEs, the first set of IEs and second set of IEs are signaled in a same signaling. According to one or more embodiments, the network node 16 is configured to transmit an updated component carrier configuration associated with the first node where the updated component carrier configuration is based on the overheating configuration and corresponds to a reduced number of component carriers compared to a previous component carrier configuration.

Figure 10:
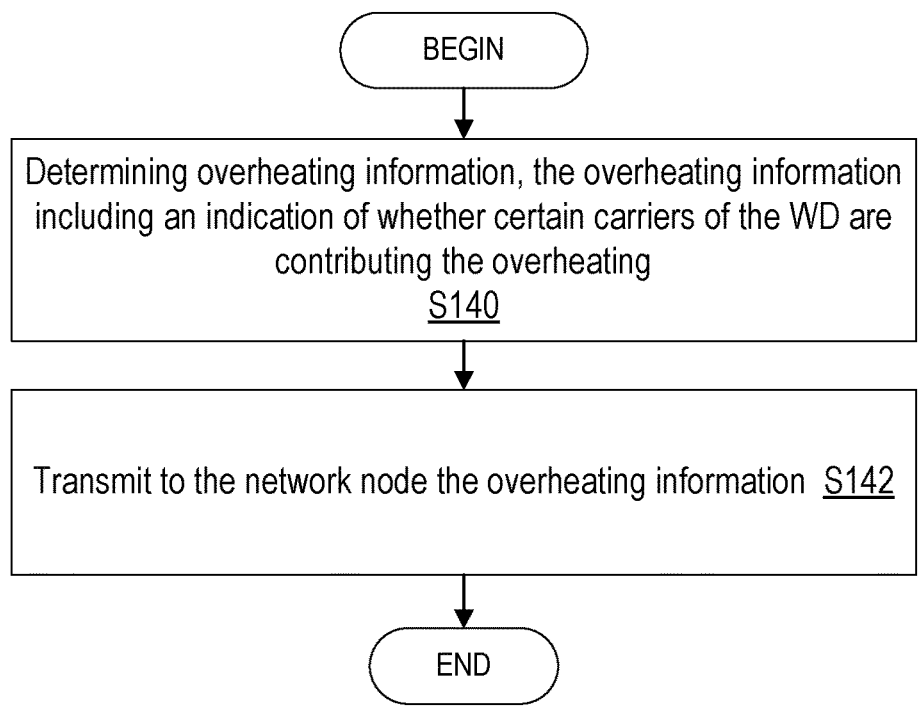
FIG. 10 is a flowchart of an example process in a wireless device for an overheating configuration in NG EN-DC.

FIG. 10 is a flowchart of an exemplary process in a wireless device 22 according to some embodiments of the present disclosure. One or more blocks described herein may be performed by one or more elements of wireless device 22 such as by one or more of processing circuitry 84 (including the overheating information determiner unit 34), processor 86, radio interface 82 and/or communication interface 60. Wireless device 22 such as via processing circuitry 84 and/or processor 86 and/or radio interface 82 is configured to determining overheating information, the overheating information including an indication of whether certain carriers of the WD 22 are contributing the overheating (Block S140). The process also includes transmitting to the network node the overheating information (Block S142).

Figure 11:
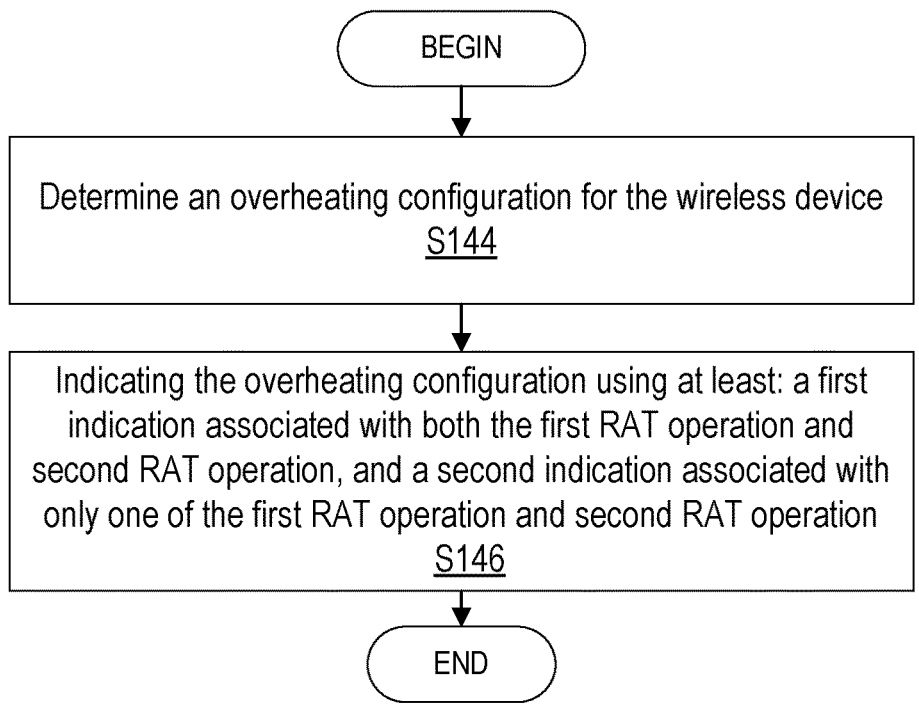
FIG. 11 is a flowchart of another example process in a wireless device for an overheating configuration in NG EN-DC.

FIG. 11 is a flowchart of an exemplary process in a wireless device 22 according to some embodiments of the present disclosure. One or more blocks described herein may be performed by one or more elements of wireless device 22 such as by one or more of processing circuitry 84 (including the overheating information unit 34), processor 86, radio interface 82 and/or communication interface 60. Wireless device 22 such as via processing circuitry 84 and/or processor 86 and/or radio interface 82 is configured to determine (Block S144) an overheating configuration for the wireless device, as described herein. Wireless device 22 such as via processing circuitry 84 and/or processor 86 and/or radio interface 82 is configured to indicate (Block S146) the overheating configuration using at least: a first indication associated with both the first RAT operation and second RAT operation, and a second indication associated with only one of the first RAT operation and second RAT operation, as described herein.

According to one or more embodiments, the first indication associated with both the first RAT and second RAT indicates a combined parameter for first RAT operation and second RAT operation, where the second indication associated with only one of the first RAT and second RAT indicates a singular parameter for only one of the first RAT operation and the second RAT operation.

According to one or more embodiments, the combined parameter corresponds to a combined number of carriers for first RAT operation and second RAT operation, and the singular parameter corresponds to a total number of carriers for only one of the first RAT operation and the second RAT operation. According to one or more embodiments, the overheating configuration corresponds to a recommended configuration determined by the wireless device 22 where the recommended configuration is different from a current wireless device configuration. According to one or more embodiments, the determining of the overheating configuration for the wireless device is triggered based at least on one of the wireless device 22 being in an overheated state and the wireless device attempting to avoid the overheated state.

According to one or more embodiments, the first RAT is Long Term Evolution, LTE, and the second RAT is New Radio, NR. According to one or more embodiments, the wireless device 22 is further configured to receive an updated configuration for uplink and downlink communications for at least one of the master node 16 and secondary node 16 where the updated configuration is based at least on the indicated overheating configuration. According to one or more embodiments, the first indication is included in a first set of information elements, IEs, for use by the first RAT, where the second indication is included in a second set of IEs for use by the second RAT, where the second set of IEs are different from the first set of IEs, and where the first set of IEs and second set of IEs are signaled in a same signaling. According to one or more embodiments, receive an updated component carrier configuration associated with at least one of the master node 16 and secondary node 16 is received where the updated component carrier configuration is based on the overheating configuration and corresponds to a reduced number of component carriers compared to a previous component carrier configuration, and the wireless device 22 is configured to operate according to the updated component carrier configuration.

Having described the general process flow of arrangements of the disclosure and having provided examples of hardware and software arrangements for implementing the processes and functions of the disclosure, the sections below provide details and examples of arrangements for an overheating configuration in NG EN-DC.

It will herein be described how the WD 22 such as via one or more of processing circuitry 84, processor 86, radio interface 82, overheating information unit 34, etc., indicates "overheating information" to a network node 16 (i.e., node 16). In some embodiments, this information may include several carriers and/or cells that the WD 22 prefers or recommends to use in order to resolve an already existing overheating situation in the WD 22, or in order to avoid a potential overheating situation, where "use" may mean to be active on, configured with, etc. As used herein, a carrier or component carrier may correspond to a cell or serving cell as the cell may be provided using the carrier. Further, in one or more embodiments, the overheating information indicates how many secondary cells (SCells) the WD 22 prefers to be configured with. In addition to one or more SCells, the WD 22 has one or more primary cells such as one for the MCG that is referred to as the primary cell (PCell) and one for the SCG that may be referred to as primary secondary cell (PSCell).

While it will used as an example that the overheating information indicates a number of carriers/cells, some embodiments could be employed for other types of overheating information as well, for example, a number of MIMO layers, or in general a number and type of resources the WD 22 determines useful to resolve or avoid overheating.

In some embodiments, the WD 22, such as via for example processing circuitry 84 and/or radio interface 82, provides overheating information for two radio access technologies (RATs), e.g., LTE and NR. However, the embodiments can be used also for the scenario where the WD 22 is communicating with (from a WD 22-perspective) two different network nodes which both operate according to the same RAT, e.g., both NR-nodes.

The terms MN, MeNB, MCG which are used interchangeably herein, refer to the node and/or cell which provides the first radio access the WD 22, which in case of (NG)EN-DC will be LTE (E-UTRA). Thus, the MN, MeNB or MCG may refer to a network node 16, i.e., node 16.

The terms SN, SgNB, SCG, are used interchangeably herein, and refer to the node and/or cell which provides the second radio access to the WD 22, which in the case of (NG)EN-DC will be NR. Thus, Sn, SgNB or SCG may also refer to a network node 16. In one or more embodiments described herein, the term MN refers to a first network node 16a (i.e., first node 16), whereas the term SN refers to a second network node 16b (i.e., second node 16).

Legacy Approach

According to existing 3GPP specifications, the overheating indication sent by the WD 22 to the MN 16 contains a single set of information and concerns both the MN 16 and SN 16.

If the MN 16 gets this information alone, the MN 16 may not be able to determine how many cells/carriers the WD 22 wants to use in the MN 16 and the SN 16 respectively.

If the WD 22 sends overheating information to the SN 16, this information will not be comprehended by the MN 16 and the MN 16 may release too many MCG carriers.

New Field with LTE-Only Info Sent to Network Node 16, Alongside the Currently (Total) Information (Approach A)

In one or more embodiments, the WD 22 indicates overheating information with a first and a second set of indications where:

the first set of indications (i.e., first indication) includes overheating information for a first RAT and a second RAT where the overheating information for the first RAT and second RAT may be referred to "total" information and may indicate a combined parameter for both RATs, the combined parameter may indicate a combined number of carriers for first and second RAT operation; and the second indication includes overheating information relating to (only) the first RAT, i.e., indicates a singular parameter for only one RAT such a total number of carriers for only the one RAT.

For example, the WD 22 such as via one or more of processing circuitry 84, processor 86, radio interface 82, overheating information unit 34, etc., may use the first indication (or first set of indications) to indicate a number of cells/carriers for both LTE and NR. In one specific example, the WD 22 may be so overheated (i.e., temperature above a predefined threshold) that the WD 22 indicates a number 0 for the overheating information such that the WD 22 recommends being configured with no SCells. That is, the WD 22 indicating a number 0 may be interpreted as the WD 22 recommending no SCells but the WD 22 may still be configured with a PCell such that the network node 16 may configured with the WD 22 with one 1 cell/carrier for the Pcell.

And alongside this, the WD 22 also indicates in a second indication a number of cells/carriers which the WD 22 considers suitable to use for LTE alone. As used herein in one or more embodiments, the WD 22 "considering", "recommending", "preferring" one or more cells/carriers may refer to the WD 22 determining that one or more cells/carriers meet a predefined criterion.

An example implementation of this approach is shown below. Parts added to implement this approach are indicated in bold. A new field overheatingAssistance-r16 is illustrated below which is of the type OverheatingAssistance-r16 information element (IE). In particular, in one or more embodiments, a field may refer to bit/bits that are sent to the WD 22 where the field can be of a certain type. An IE may be considered a type such as INTEGERs. In the overheating indication the WD 22 may signal a number of carriers where the type of the "number of carriers" field is an INTEGER. That IE contains a field reducedMaxCCs-EUTRA which can carry information specifically related to LTE, according to the following pseudo code:

```
UEAssistanceInformation-v1450-IEs ::=    SEQUENCE {
    overheatingAssistance-r14
    OverheatingAssistance-r14            OPTIONAL,
    nonCriticalExtension
    UEAssistanceInformation-v1530-IEs    OPTIONAL
}
UEAssistanceInformation-v1530-IEs ::= SEQUENCE {
    sps-AssistanceInformation-v1530          SEQUENCE {
        trafficPatternInfoListSL-v1530
    TrafficPatternInfoList-v1530
    }    OPTIONAL,
    nonCriticalExtension
    UEAssistanceInformation-v16xy-IEs    OPTIONAL
}
UEAssistanceInformation-v16xy-IEs ::= SEQUENCE {
    overheatingAssistance-r16
    OverheatingAssistance-r16            OPTIONAL,
    nonCriticalExtension
    SEQUENCE { }
    OPTIONAL
}
OverheatingAssistance-r14 ::=    SEQUENCE {
    reducedUE-Category                SEQUENCE {
        reducedUE-CategoryDL              INTEGER (0..19),
        reducedUE-CategoryUL              INTEGER (0..21)
    }    OPTIONAL,
    reducedMaxCCs                     SEQUENCE {
```

```
        reducedCCsDL                    INTEGER
(0..31),
        reducedCCsUL                    INTEGER
(0..31)
        }       OPTIONAL
}
OverheatingAssistance-r16 ::=   SEQUENCE {
        reducedMaxCCs-EUTRA             SEQUENCE {
            reducedCCsDL                INTEGER
(0..31),
            reducedCCsUL                INTEGER
(0..31)
        }       OPTIONAL
}
```

In one or more embodiments, the first indication is included in a first set of IEs for use by the first RAT, and the second indication is included in a second set of IEs for use by the second RAT where the second set of IEs are different from the first set of IEs and the first set of IEs and second set of IEs are signaled in a same signaling as illustrated above.

The Existing Field in LTE Overheating Information can Indicate LTE-Only Info (Approach B)

In one embodiment, the WD 22 such as via one or more of processing circuitry 84, processor 86, radio interface 82, overheating information unit 34, etc., indicates the overheating information in two sets of indications:

In a first set of indications, the WD 22 such as via one or more of processing circuitry 84, processor 86, radio interface 82, overheating information unit 34, etc., indicates whether the second set of indications refers to carriers in both the first RAT and the second RAT (the legacy interpretation of the indication); or refers to carriers in only the first RAT, In a second set of indications, the WD 22 such as via one or more of processing circuitry 84, processor 86, radio interface 82, overheating information unit 34, etc., indicates information relating to either both the first and the second RAT, or (only) the first RAT. For example, the overheating information may indicate how many cells/carriers the WD 22 wants to use in LTE and NR, or how many cells/carriers the WD 22 wants to use in (only) LTE. In one or more embodiments, the overheating information may indicate a recommended configuration that is different from the WD 22's current wireless device 22 configuration where the WD 22 may receive an updated configuration based on the recommended configuration.

An example implementation of this approach is shown below, where the setting and interpretation of the fields reducedCCsDL and reducedCCsUL depend on the value and/or the presence/absence of another parameter (e.g., parameterX)

```
UEAssistanceInformation-v1450-IEs ::=   SEQUENCE {
    overheatingAssistance-r14
    OverheatingAssistance-r14               OPTIONAL,
    nonCriticalExtension
    UEAssistanceInformation-v1530-IEs       OPTIONAL
}
UEAssistanceInformation-v1530-IEs ::=   SEQUENCE {
    sps-AssistanceInformation-v1530         SEQUENCE {
        trafficPatternInfoListSL-v1530
    TrafficPatternInfoList-v1530
    }       OPTIONAL,
    nonCriticalExtension                    SEQUENCE { }
                                            OPTIONAL
}
OverheatingAssistance-r14 ::= SEQUENCE {
    reducedUE-Category                      SEQUENCE {
        reducedUE-CategoryDL                INTEGER (0..19),
        reducedUE-CategoryUL                INTEGER (0..21)
    }       OPTIONAL,
    reducedMaxCCs                           SEQUENCE {
        reducedCCsDL                        INTEGER
(0..31),
        reducedCCsUL                        INTEGER
(0..31)
    }       OPTIONAL
}.
```

The following two definitions are provided.

--- reducedCCsDL
Indicates the WD 22's preference on reduced configuration corresponding to the maximum number of downlink SCells indicated by the field, to address overheating. In (NG)EN-DC, if parameterX is absent, this maximum number includes both SCells of E-UTRA and PSCell/SCells of NR, otherwise this maximum number includes only SCells of E-UTRA.
reducedCCsUL
Indicates the WD 22's preference on reduced configuration corresponding to the maximum number of uplink SCells indicated by the field, to address overheating. In (NG)EN-DC, if parameterX is absent, this maximum number includes both SCells of E-UTRA and PSCell/SCells of NR, otherwise this maximum number includes only SCells of E-UTRA.

---

Conditionally Selecting Approach for Sending Overheating Information

Different approaches have been described for how to send overheating information to the network node 16, i.e., the legacy approach, Approach A, and Approach B. The WD 22 may apply Approach A or apply Approach B based on one or more conditions. Example conditions are described below.

WD 22 has been Configured to Apply a Certain Approach

In some embodiments, the WD 22 may apply Approach A or apply Approach B only if configured to do so by the network.

It may be that the MN 16 prefers that the WD 22 applies a certain approach, or that the MN does not support Approach A or Approach B, etc. In some embodiments, the WD 22 may only apply a certain approach if configured to do so by the network node 16. In absence of such a configuration the WD 22 may apply the legacy approach.

WD 22 is Configured with Dual Connectivity

In some embodiments, the WD 22 may apply Approach A or apply Approach B only if configured with Dual Connectivity.

In some embodiments, the WD 22 may apply Approach A or apply Approach B only if the WD 22 is configured with a second RAT. For example, consider a scenario where the WD 22 is configured with Dual Connectivity and is configured to apply Approach A or configured to apply Approach B. This may be followed by the network node 16 de-configuring dual connectivity. In this scenario it may be preferred that the WD 22 reverts back to applying the legacy behavior.

WD 22 Sends Overheating Information to the SN 16

The WD 22 may select which approach the WD 22 applies depending on whether it sends overheating information which is destined to be sent to the SN 16. For example, if the WD 22 sends overheating information which is to be sent to the SN 16 it may be sent via the MN 16 in a container within the message sent to the MN 16. The WD 22 may apply one approach if such a container is included, while another approach may be applied, otherwise.

For example, if the WD 22 sends overheating information which should be sent to the SN 16, the WD 22 may apply Approach B (information sent to MN 16 contains LTE-only information), while otherwise it may apply the legacy approach or Approach A.

How the Network, e.g., Network Node 16, Interprets the Indications

Since the WD 22 may place different information within the overheating fields depending on which approach the WD 22 applies, the network node 16 may need to know how to interpret the information received from the WD 22. Methods for this are provided below.

Explicit Indication of how to Interpret an Overheating Indication

In one embodiment, the WD 22 indicates how an overheating indication should be interpreted. The WD 22 may indicate if certain overheating information should be interpreted as:
  a) Interpretation 1 that concerns both a first RAT and a second RAT; and/or
  b) Interpretation 2 that concerns only a first RAT.
The WD 22 may indicate the interpretation by a flag.

In one approach the flag is set to a first value if Interpretation 1 is valid, and to a second value if Interpretation 2 is valid. In another approach, if a flag is present it indicates that interpretation A is valid, while if it is absent it indicates that interpretation B is valid.

Implicit Method

As described above, the WD 22 may conditionally select an Approach depending on whether WD 22 sends information that is to be sent to the SN 16, a situation described above in the "WD 22 sends overheating information to the SN 16" section. The information which is to be sent to the SN 16 may, as described above, be sent via the MN 16 in a container which the MN 16 sends to the SN 16.

If the WD 22 applies this rule, the network, e.g., network node 16, can determine which approach the WD 22 has applied depending on whether or not the WD 22 has included the information which is to be sent to the SN 16.

Cloud Implementation

Some embodiments may be implemented in the radio resource control (RRC) protocol. For example, a RRC entity in the network may be implemented in a network cloud environment, hence some embodiments may be implemented at least in part in the network cloud environment.

According to one aspect, a network node 16 includes a radio interface 62 and/or comprising processing circuitry 68 configured to receive overheating information from the WD 22, the overheating information including an indication of whether the overheating information concerns only a first radio access technology, RAT. The processing circuitry 68 is further configured to assign, via carrier unit 32, carriers to the WD 22 according to the overheating information. According to this aspect, in some embodiments, the assigned carriers are carriers for at least one RAT.

According to another aspect, method implemented in a network node 16 includes receiving overheating information from the WD 22, the overheating information including an indication of whether the overheating information concerns only a first radio access technology, RAT. The method also includes assigning carriers to the WD 22 according to the overheating information. According to this aspect, the assigned carriers are carriers for at least one RAT.

According to yet another aspect, a WD 22 includes a radio interface 82 and/or processing circuitry 84 configured to determining, via the overheating information unit 34, overheating information, the overheating information including an indication of whether certain carriers of the WD 22 are contributing the overheating, and transmit to the network node 16 the overheating information.

According to this aspect, in some embodiments, the indication is one of carriers for both LTE and NR or only for LTE. In some embodiments, whether the indication is for both LTE and NR or only for LTE depends on whether the WD 22 is configured for dual connectivity. In some embodiments, information about the assigned carriers relates to a secondary node and is sent to the secondary node by the network node 16.

According to another aspect, a method implemented in a WD 22 is provided. The method includes determining overheating information, the overheating information including an indication of whether certain carriers of the WD 22 are contributing the overheating and transmitting to the network node 16 the overheating information.

According to this aspect, in some embodiments, the indication is one of carriers for both LTE and NR or only for LTE. In some embodiments, whether the indication is for both LTE and NR or only for LTE depends on whether the WD 22 is configured for dual connectivity. In some embodiments, information about the assigned carriers relates to a secondary node and is sent to the secondary node by the network node 16.

Some Examples

Example A1. A network node 16 configured to communicate with a wireless device 22 (WD 22), the network node 16 configured to, and/or comprising a radio interface 62 and/or comprising processing circuitry 68 configured to:
  receive overheating information from the WD 22, the overheating information including an indication of whether the overheating information concerns only a first radio access technology, RAT; and
  assign carriers to the WD 22 according to the overheating information.

Example A2. The network node 16 of Example A1, wherein the assigned carriers are carriers for at least one RAT.

Example B1. A method implemented in a network node 16, the method comprising
  receiving overheating information from the WD 22, the overheating information including an indication of whether the overheating information concerns only a first radio access technology, RAT; and
  assigning carriers to the WD 22 according to the overheating information.

Example B2. The Method of Example B1, wherein the assigned carriers are carriers for at least one RAT.

Example C1. A wireless device 22 (WD 22) configured to communicate with a network node 16, the WD 22 configured to, and/or comprising a radio interface 62 and/or processing circuitry 68 configured to:

determine overheating information, the overheating information including an indication of whether certain carriers of the WD 22 are contributing the overheating; and transmit to the network node 16 the overheating information.

Example C2. The WD 22 of Example C1, where the indication is one of carriers for both LTE and NR or only for LTE.

Example C3. The WD 22 of Example C2, wherein whether the indication is for both LTE and NR or only for LTE depends on whether the WD 22 is configured for dual connectivity.

Example C4. The WD 22 of Examples C2 and C3, wherein information about the assigned carriers relates to a secondary node 16 and is sent to the secondary node by the network node 16.

Example D1. A method implemented in a wireless device 22 (WD 22), the method comprising:

determining overheating information, the overheating information including an indication of whether certain carriers of the WD 22 are contributing the overheating; and transmitting to the network node 16 the overheating information.

Example D2. The method of Example D1, where the indication is one of carriers for both LTE and NR or only for LTE.

Example D3. The method of Example D2, wherein whether the indication is for both LTE and NR or only for LTE depends on whether the WD is configured for dual connectivity.

Example D4. The method of Examples D2 and D3, wherein information about the assigned carriers relates to a secondary node 16 and is sent to the secondary node 16 by the network node 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device configured to communicate with a master node configured to operate using a first radio access technology (RAT), and to communicate a secondary node configured to operate using a second RAT, the wireless device configured to:
   determine an overheating configuration for the wireless device;
   indicate the overheating configuration using at least:
      a first indication associated with both a first RAT operation and a second RAT operation; and
      a second indication associated with only one of the first RAT operation and the second RAT operation; and
   receive an updated component carrier configuration associated with at least one of the master node and the secondary node, the updated component carrier configuration based on the overheating configuration and corresponding to a reduced number of component carriers compared to a previous component carrier configuration, wherein the first indication is included in a first set of information elements (IEs), for use by the first RAT, and the second indication is included in a second set of IEs for use by the second RAT, the second set of IEs being different from the first set of IEs, the first set of IEs and second set of IEs being signaled in a same signaling.

2. A first node configured to operate using a first radio access technology (RAT), for communicating with a wireless device, the wireless device being further configured to communicate with a second node configured to operate using a second RAT, the first node configured to:
   receive an indication of an overheating configuration of the wireless device, the indication including at least:
      a first indication associated with both a first RAT operation and a second RAT operation; and
      a second indication associated with only one of the first RAT operation and the second RAT operation; and
   transmit an updated component carrier configuration associated with the first node, the updated component carrier configuration being based on the overheating configuration and corresponding to a reduced number of component carriers compared to a previous component carrier configuration, wherein the first indication is included in a first set of information elements (IEs), for use by the first RAT, and the second indication is included in a second set of IEs for use by the second RAT, the second set of IEs being different from the first set of IEs, the first set of IEs and second set of IEs being signaled in a same signaling.

3. A method implemented by a wireless device that is configured to communicate with a master node configured to operate using a first radio access technology (RAT), and to communicate a secondary node configured to operate using a second RAT, the method comprising:
   determining an overheating configuration for the wireless device;
   indicating the overheating configuration using at least:
      a first indication associated with both a first RAT operation and a second RAT operation; and
      a second indication associated with only one of the first RAT operation and the second RAT operation; and
   receiving an updated component carrier configuration associated with at least one of the master node and the secondary node, the updated component carrier configuration based on the overheating configuration and corresponding to a reduced number of component carriers compared to a previous component carrier configuration, wherein the first indication is included in a first set of information elements (IEs), for use by the first RAT, and the second indication is included in a second set of IEs for use by the second RAT, the second set of IEs being different from the first set of IEs, the first set of IEs and second set of IEs being signaled in a same signaling.

4. The method of claim 3, wherein the first indication associated with both the first RAT operation and the second RAT operation indicates a combined parameter for the first RAT operation and the second RAT operation; and
   the second indication associated with only one of the first RAT operation and the second RAT operation indicates a singular parameter for only one of the first RAT operation and the second RAT operation.

5. The method of claim 4, wherein the combined parameter corresponds to a combined number of carriers for the first RAT operation and the second RAT operation and wherein the singular parameter corresponds to a total number of carriers for only one of the first RAT operation and the second RAT operation.

6. The method of claim 3, wherein the overheating configuration corresponds to a recommended configuration determined by the wireless device, the recommended configuration being different from a current wireless device configuration.

7. The method of claim 3, wherein the determining of the overheating configuration for the wireless device is triggered based at least on one of the wireless device being in an overheated state and the wireless device attempting to avoid the overheated state.

8. The method of claim 3, wherein the first RAT is Long Term Evolution (LTE), and the second RAT is New Radio (NR).

9. The method of claim 3, wherein the wireless device is further configured to receive an updated configuration for uplink and downlink communications for at least one of the master node and secondary node, the updated configuration being based at least on the indicated overheating configuration.

10. The method of claim 3, further comprising:
   operating according to the updated component carrier configuration.

11. A method implemented by a first node configured to operate using a first radio access technology (RAT), for communicating with a wireless device, the wireless device being further configured to communicate with a second node configured to operate using a second RAT, the method comprising:
   receiving an indication of an overheating configuration of the wireless device, the indication including at least:
      a first indication associated with both a first RAT operation and a second RAT operation; and
      a second indication associated with only one of the first RAT operation and the second RAT operation; and
   transmitting an updated component carrier configuration associated with the first node, the updated component carrier configuration being based on the overheating configuration and corresponding to a reduced number of component carriers compared to a previous component carrier configuration, wherein the first indication is included in a first set of information elements (IEs), for use by the first RAT, and the second indication is included in a second set of IEs for use by the second RAT, the second set of IEs being different from the first set of IEs, the first set of IEs and second set of IEs being signaled in a same signaling.

12. The method of claim 11, wherein the first indication associated with both the first RAT operation and the second RAT operation indicates a combined parameter for the first RAT operation and the second RAT operation; and
the second indication associated with only one of the first RAT operation and the second RAT operation indicates a singular parameter for only one of the first RAT operation and the second RAT operation.

13. The method of claim 12, wherein the combined parameter corresponds to a combined number of carriers for the first RAT operation and the second RAT operation and wherein the singular parameter corresponds to a total number of carriers for only one of the first RAT operation and the second RAT operation.

14. The method of claim 11, wherein the overheating configuration corresponds to a recommended configuration determined by the wireless device, the recommended configuration being different from a current wireless device configuration.

15. The method of claim 11, wherein the overheating configuration indicates that the wireless device is one of in an overheated state and is attempting to avoid the overheated state.

16. The method of claim 11, wherein the first RAT is Long Term Evolution (LTE), and the second RAT is New Radio (NR).

17. The method of claim 11, further comprising transmitting an updated configuration for uplink and downlink communications for the first node, the updated configuration being based at least on the indicated overheating configuration.

* * * * *